United States Patent
Park et al.

(10) Patent No.: US 10,736,129 B2
(45) Date of Patent: Aug. 4, 2020

(54) METHOD AND APPARATUS FOR TRANSMITTING AND RECEIVING DATA INFORMATION IN WIRELESS COMMUNICATION SYSTEM

(71) Applicant: Samsung Electronics Co., Ltd., Suwon-si, Gyeonggi-do (KR)

(72) Inventors: Sung-jin Park, Incheon (KR); Jeong-ho Yeo, Hwaseong-si (KR); Jin-young Oh, Seoul (KR); Tae-han Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/148,329

(22) Filed: Oct. 1, 2018

(65) Prior Publication Data
US 2019/0104532 A1   Apr. 4, 2019

(30) Foreign Application Priority Data
Sep. 29, 2017   (KR) .................. 10-2017-0128313

(51) Int. Cl.
*H04W 72/12* (2009.01)
*H04W 72/04* (2009.01)
(Continued)

(52) U.S. Cl.
CPC ....... *H04W 72/1263* (2013.01); *H04L 1/1812* (2013.01); *H04L 5/0048* (2013.01);
(Continued)

(58) Field of Classification Search
CPC .......... H04W 72/1263; H04W 72/0446; H04L 1/1812; H04L 5/0048; H04L 5/0082;
(Continued)

(56) References Cited

U.S. PATENT DOCUMENTS

2013/0294333 A1   11/2013   Chen et al.
2014/0086152 A1*  3/2014   Bontu ................... H04L 1/1812
                                                     370/329
(Continued)

OTHER PUBLICATIONS

Samsung, "Discussion on RB Bundling for DM-RS", 3GPP Draft; R1-102187, RB Boundling, 3rd Generation Partnership Project (3GPP), Mobile Competence Centre; 650, Route Deslucioles; F-06921 Sophia-Antipolis Cedex; France, Apr. 6, 2010, XP050419467, Beijing, China.

(Continued)

*Primary Examiner* — Kibrom T Hailu
(74) *Attorney, Agent, or Firm* — Jefferson IP Law, LLP

(57) ABSTRACT

A method, performed by a terminal in a wireless communication system, of transmitting and receiving data information is provided. The method includes receiving multiple transmission unit scheduling information, receiving information about whether demodulation reference signal (DMRS) time bundling is feasible with respect to DMRS information respectively contained in a plurality of transmission units scheduled according to the multiple transmission unit scheduling information, and when the information indicates that the DMRS time bundling is feasible, performing decoding on data information based on at least one of a hybrid automatic request (HARQ) acknowledge (ACK)/ negative acknowledge (NACK) transmission time, a size of a frequency resource of a downlink (DL) physical data channel to which the data information scheduled according to the multiple transmission unit scheduling information is assigned, a timing advance value, and a time required for a valid data process.

18 Claims, 6 Drawing Sheets

(51) Int. Cl.
*H04L 1/18* (2006.01)
*H04L 5/00* (2006.01)

(52) U.S. Cl.
CPC .......... *H04L 5/0082* (2013.01); *H04L 5/0094* (2013.01); *H04W 72/0446* (2013.01); *H04L 5/0023* (2013.01); *H04L 5/0055* (2013.01)

(58) Field of Classification Search
CPC ... H04L 5/0094; H04L 5/0023; H04L 5/0055; H04L 1/18; H04L 27/261; H04L 2025/03777
See application file for complete search history.

(56) References Cited

U.S. PATENT DOCUMENTS

2015/0280876 A1* 10/2015 You .................. H04L 5/0048
370/329

2016/0270059 A1* 9/2016 Chen .................. H04L 5/0051
2016/0270072 A1* 9/2016 Andgart ............... H04L 5/0007
2017/0303248 A1* 10/2017 Chatterjee ............. H04L 1/189

OTHER PUBLICATIONS

Huawei et al., "Design of DL DMRS for data transmission", 3GPP Draft; R1-1712243, 3rd Generation Partnership Project(3GPP), Mobile Competence Centre; 650, Route Deslucioles; F-06921 Sophia-Antipolis Cedex; France, Aug. 20, 2017, XP051315060, Prague, Czech Republic.

CATT Samsung, "WF on configurable bundling of DMRS", 3GPP Draft; R1-1703734, WF on DMRS Bundling 1, 3rd Generation Partnership Project (3GPP), Mobile Competence Centre; 650, Route Des Lucioles; F-06921 Sophia-Antipolis Cedex; France, Feb. 15, 2017, XP0512222169, Athens, Greece.

European Search Report dated Feb. 14, 2019, issued in European Patent Application No. 18197634.1.

* cited by examiner

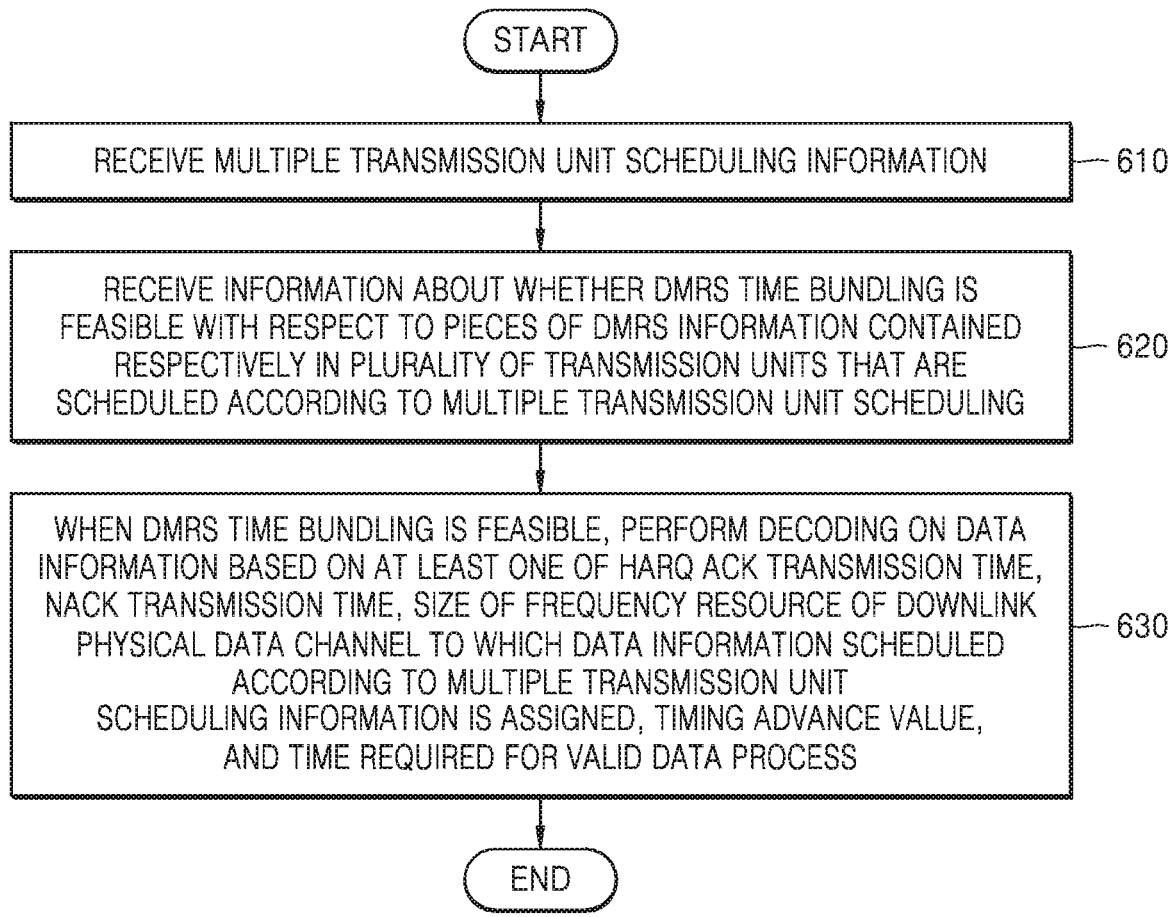
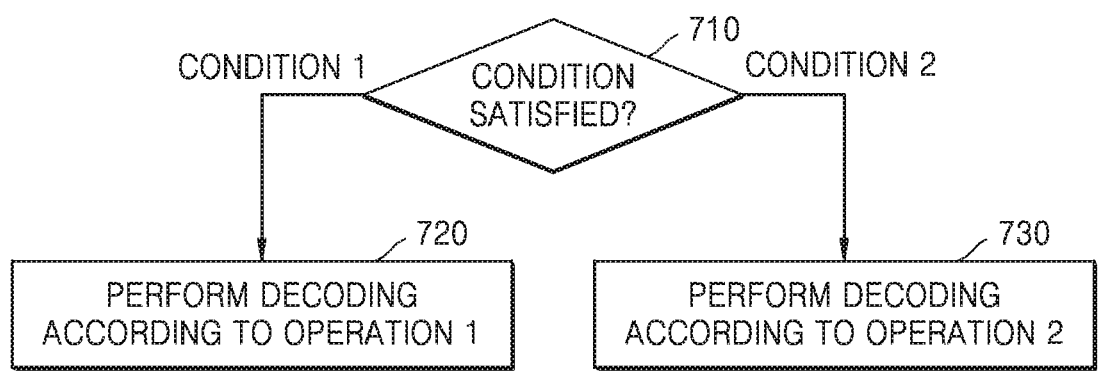

METHOD AND APPARATUS FOR TRANSMITTING AND RECEIVING DATA INFORMATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2017-0128313, filed on Sep. 29, 2017, in the Korean Intellectual Property Office, the disclosure of which is incorporated by reference herein in its entirety.

BACKGROUND

1. Field

The disclosure relates to wireless communication systems and to methods and apparatuses enabling a wireless communication system to smoothly provide a service. More particularly, the disclosure relates to a method and apparatus for transmitting and receiving data in a wireless communication system.

2. Description of Related Art

To meet the increase in demand for wireless data traffic after the commercialization of $4^{th}$ generation (4G) communication systems, considerable efforts have been made to develop pre-$5^{th}$ generation (5G) communication systems or 5G communication systems. This is one reason why "5G communication systems" or "pre-5G communication systems" are called "beyond 4G network communication systems" or "post long-term evolution (LTE) systems". In order to achieve a high data transmission rate, 5G communication systems are being developed to be implemented in a super-high frequency band (millimeter wave (mmWave)), e.g., a band of 60 GHz. In order to reduce the occurrence of stray electric waves in such a super-high frequency band and to increase a transmission distance of electric waves in 5G communication systems, various technologies are being studied, for example: beamforming, massive multiple input multiple output (MIMO), full dimensional MIMO (FD-MIMO), array antennas, analog beam-forming, and large scale antennas. In order to improve system networks for 5G communication systems, various technologies have been developed, including evolved small cells, advanced small cells, cloud radio access networks (cloud RAN), ultra-dense networks, device-to-device communication (D2D), wireless backhaul, moving networks, cooperative communication, coordinated multi-points (CoMP), and interference cancellation. Also, for 5G communication systems, other technologies have been developed, including hybrid modulation of frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the internet of things (IoT), where distributed configurations, such as objects, exchange information with each other to process the information. internet of everything (IoE) technology is being newly provided, in which technology related to the IoT is combined with, for example, technology for processing big data through connection with a cloud server. In order to implement the IoT, various technical components are required, such as, a sensing technique, wired/wireless communication and network infrastructures, a service interfacing technique, a security technique, etc. In recent years, techniques including a sensor network for connecting objects, machine to machine (M2M) communication, machine type communication (MTC), etc. have been studied. In the IoT environment, intelligent internet technology (IT) services may be provided to collect and analyze data obtained from objects connected to each other and thus to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are implemented by using 5G communication technology including beam-forming, MIMO, array antenna, etc. The application of the cloud RAN as a big data processing technique described above may be an example of convergence of the 5G communication technology and the IoT technology.

As described above, with the development of wireless communication systems, various services are now providable, and thus, a way of smoothly providing these services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and apparatuses for transmitting and receiving data information so that a wireless communication system may effectively provide a service.

Additional aspects will be set forth in part in the description which follows and, in part, will be apparent from the description, or may be learned by practice of the presented embodiments.

In accordance with an aspect of the disclosure, a method, performed by a terminal in a wireless communication system, of transmitting and receiving data information is provided. The method includes receiving multiple transmission unit scheduling information, receiving information about whether demodulation reference signal (DMRS) time bundling is feasible with respect to DMRS information respectively contained in a plurality of transmission units scheduled according to the multiple transmission unit scheduling information, and when the information indicates that the DMRS time bundling is feasible, performing decoding on data information based on at least one of a hybrid automatic request (HARQ) acknowledge (ACK)/negative acknowledge (NACK) transmission time, a size of a frequency resource of a downlink (DL) physical data channel to which the data information scheduled according to the multiple transmission unit scheduling information is assigned, a timing advance value, and a time required for a valid data process.

In accordance with another aspect of the disclosure, a terminal for transmitting and receiving data information in a wireless communication system is provided. The terminal includes a communicator configured to communicate with a base station (BS), and at least one processor configured to receive multiple transmission unit scheduling information, receive information about whether DMRS time bundling is feasible with respect to DMRS information respectively contained in a plurality of transmission units scheduled according to the multiple transmission unit scheduling information, and, when the information indicates that the DMRS time bundling is feasible, perform decoding on data information based on at least one of a HARQ ACK transmission time/NACK transmission time, a size of a frequency resource of a DL physical data channel to which the data information scheduled according to the multiple transmission unit scheduling information is assigned, a timing advance value, and a time required for a valid data process.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a flowchart of a method, performed by a terminal, of transmitting and receiving data information, according to an embodiment of the disclosure;

FIG. 7 is a flowchart of a method, performed by a terminal, of processing data information, according to an embodiment of the disclosure;

Throughout the drawings, like reference numerals will be understood to refer to like parts, components, and structures.

DETAILED DESCRIPTION

Figure 1:
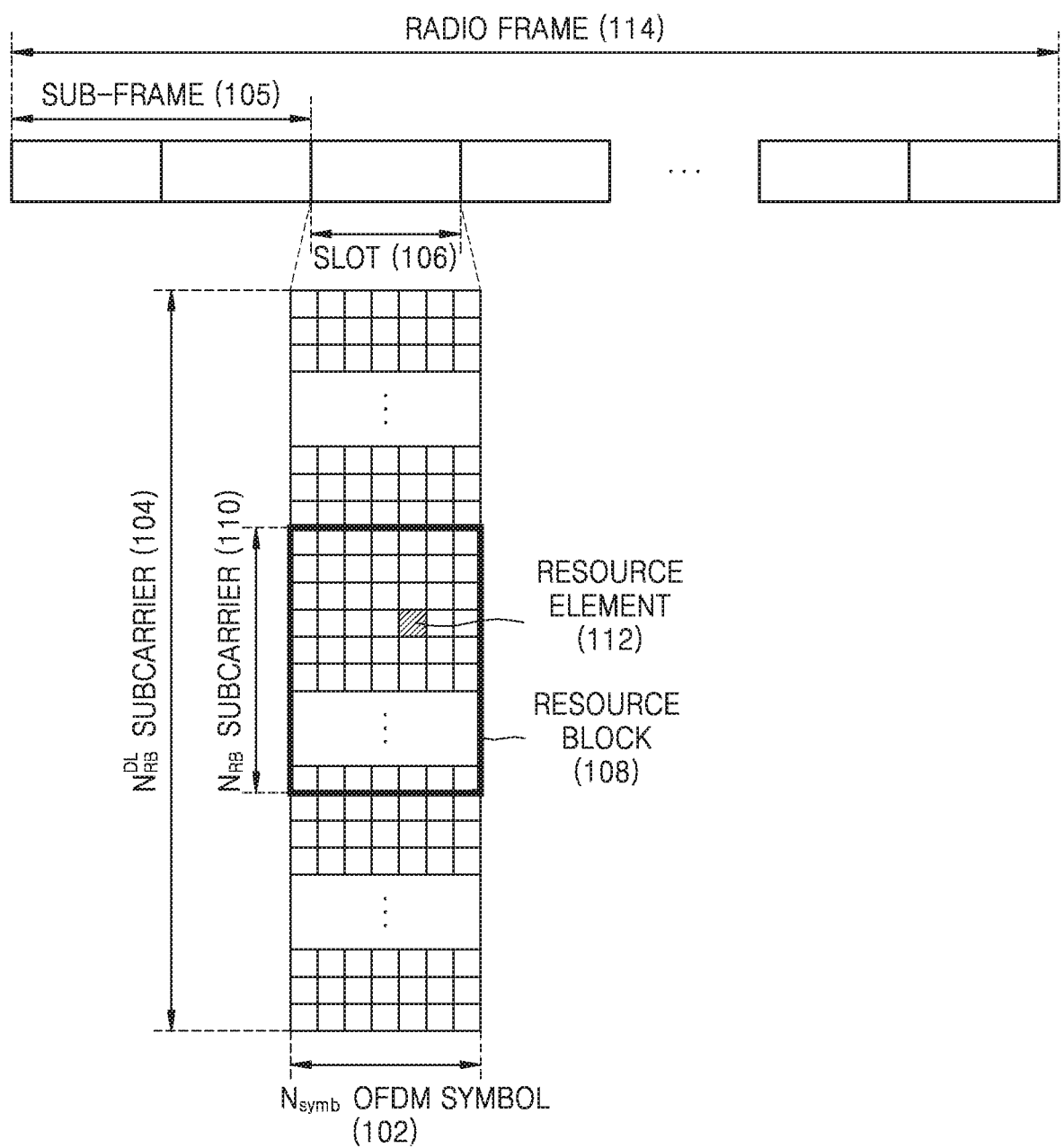
FIG. 1 is a diagram of a transmission structure of a time-frequency domain that is a downlink (DL) wireless resource region of a long-term evolution (LTE) system or a similar system according to an embodiment of the disclosure.

The following description with reference to accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reasons, components may be exaggerated, omitted, or schematically illustrated in drawings for clarity. Also, the size of each component does not completely reflect the actual size. In the drawings, like reference numerals denote like elements.

As used herein, the term "and/or" includes any and all combinations of one or more of the associated listed items. Expressions such as "at least one of," when preceding a list of elements, modify the entire list of elements and do not modify the individual elements of the list.

Advantages and features of one or more embodiments of the present disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the present disclosure will only be defined by the appended claims.

Here, it will be understood that combinations of blocks in flowcharts or process flow diagrams may be performed by computer program instructions. Since these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

The term "unit" in the embodiments of the present disclosure means a software component or hardware component such as a field-programmable gate array (FPGA) or an application-specific integrated circuit (ASIC), and performs a specific function. However, the term "unit" is not limited to software or hardware. The unit may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and units may be associated with the smaller number of components and units, or may be divided into additional components and units. Furthermore, the components and units may be embodied to reproduce one or more central processing units (CPUs) in a device or security multimedia card. Also, in the embodiments, the unit may include at least one processor.

A wireless communication system has evolved from providing initial voice-oriented services to, for example, a broadband wireless communication system providing a high-speed and high-quality packet data service, such as communication standards of high speed packet access (HSPA), long-term evolution (LTE) or evolved universal terrestrial radio access (E-UTRA), and LTE-advanced (LTE-A) of third generation partnership project (3GPP), high rate packet data (HRPD) and ultra mobile broadband (UMB) of 3GPP2, and 802.16e of Institute of Electrical and Electronics Engineers (IEEE). A $5^{th}$ generation (5G) or new radio (NR) communication standards are being developed with 5G wireless communication systems.

In the 5G wireless communication systems, at least one service among enhanced mobile broadband (eMBB), massive machine type communications (mMTC), and ultra-reliable and low-latency communications (URLLC) may be provided to a terminal. These services may be provided to the same terminal or to different terminals during the same time period. In an embodiment, eMBB may be a service aiming at high-speed transmission of high capacity data, mMTC may be a service aiming at terminal power minimization and multiple terminal connections, and URLLC may be a service aiming at high reliability and low delay, but are not limited thereto. In addition, such services may be a major scenario in an LTE system or in a system such as 5G/NR (new radio, next radio) after LTE. A method for coexistence of at least two services among eMBB, mMTC, and URLLC and an apparatus using the method are described herein.

A base station (BS) may schedule eMBB data corresponding to an eMBB service to a specific terminal in a transmission time interval (TTI). When a situation occurs in which URLLC data corresponding to a URLLC service needs be transmitted in the TTI, the URLLC data may be transmitted without transmitting a part of the eMBB data in a frequency band in which the eMBB data is already scheduled and transmitted. A terminal scheduled for the eMBB data and a terminal scheduled for the URLLC data may be the same terminal or may be different terminals. In such a case, there occurs an interval in which a part of the eMBB data that has already been scheduled and transmitted is not transmitted, and thus a possibility that the eMBB data may be damaged increases. Accordingly, it is necessary to determine a method of receiving a signal from the terminal scheduled for the eMBB data or the terminal scheduled for the URLLC data, and a method of processing a received signal.

In one or more embodiments, a method and apparatus capable of transmitting information according to each service when information according to different services are simultaneously scheduled by sharing some or all frequency bands will be described. For example, a method and apparatus capable of transmitting information according to each service when information according to an eMBB service and a URLLC service are scheduled in the same TTI, when information according to an mMTC service and a URLLC service are scheduled in the same TTI, when information according to an mMTC service and an eMBB service are scheduled in the same TTI, or when information according to an eMBB service, a URLLC service, and an mMTC service are scheduled in the same TTI will be described.

A reference signal (RS) is a signal used in demodulation and decoding of a data symbol received by measuring a state of a channel between a BS and a user, such as channel strength, distortion, interference strength, or Gaussian noise in a wireless mobile communication system. A RS may also be used to measure a state of a wireless channel. A receiver may determine a state of a wireless channel between the receiver and a transmitter by measuring reception strength of a RS received over the wireless channel, with respect to the RS transmitted by the transmitter at promised transmit power. The state of such a wireless channel may be used to determine what data rate the receiver will request from the transmitter.

In a general mobile communication system, since wireless resources such as time, frequency, and transmission power for transmitting a signal are limited, it is difficult to assign a large amount of wireless resources to a RS. When a large amount of wireless resources are assigned to the RS, the wireless resources that may be assigned to a data signal are relatively reduced. Therefore, the wireless resources assigned to the RS should be appropriately determined in consideration of system throughput. Particularly, when a multiple input multiple output (MIMO) that performs transmission and reception using a plurality of antennas is applied, it is very important to assign and measure a RS.

A RS is a signal transmitted from a BS so that a terminal may perform channel estimation. In an LTE communication system, the RS may include a common RS and a demodulation reference signal (DMRS) as one of dedicated RSs. The common RS is a RS transmitted over the entire downlink (DL) band, may be received by all terminals, and may be used for channel estimation, feedback information configuration of terminals, or decoding of control channels and data channels. The DMRS may also be used for data channel decoding and channel estimation of a specific terminal as a RS transmitted over the entire DL band, and unlike the common RS, it is not used for feedback information configuration. Therefore, the DMRS may be transmitted through a physical resource block (PRB) to be scheduled by a terminal.

In channel estimation for data decoding using a DMRS, PRB bundling linked to a system band may be used in the LTE system. More specifically, channel estimation may be performed in a precoding resource block group (PRG) that is a bundling unit. In terms of time, a channel is estimated assuming that the same precoding is used only for a DMRS in one TTI. Unlike a common RS, the use of the DMRS in time and frequency bands is limited, and thus estimation performance of the DMRS is lower than that of the common RS.

5G requires a method for improving channel estimation performance of such a DMRS. As the method for improving channel estimation performance of a DMRS, DMRS bundling in terms of time may be considered in addition to DMRS bundling in terms of frequency. For example, when a terminal receives uplink (UL) or DL data scheduling for consecutive slots from a BS through DL control information, there may be a situation where DMRSs respectively included in the slots may be bundled in terms of time. When the BS performs the UL or DL data scheduling on the consecutive slots through DL control information and bundling is feasible between DMRSs located the in consecutive slots in terms of time, it is feasible for a terminal to increase channel estimation performance of the DMRS, thereby increasing a data demodulation and/or decoding probability. In contrast, when the terminal is unable to perform bundling on the DMRS even by receiving the UL or DL data scheduling for one slot through control information from the BS or receiving the upward or DL data scheduling for consecutive slots, the terminal performs channel estimation using a DMRS for each slot and performs demodulation and/or decoding on a transport block (TB) transmitted together with the DMRS in the corresponding slot through channel estimation.

When DMRS bundling is performed in terms of time (DMRS time bundling), demodulation and/or decoding performance may be increased with respect to TBs (or code block groups or code blocks) transmitted for each slot by increasing channel estimation performance as described above, but additional time is required to complete channel estimation on a DMRS. When DMRS bundling is performed in terms of time, the completion time of demodulation and/or decoding with respect to TBs included in bundleable slots and the preparation completion time of a hybrid automatic repeat request acknowledgement (HARQ-ACK) report may be delayed. Accordingly, a terminal adaptively performs channel estimation based on the DMRS bundling in terms of time to effectively perform demodulation and/or decoding with respect to TBs, code blocks, or code block groups subjected to multiple slot scheduling (or slot-aggregation scheduling, multislot scheduling, or slot bundling scheduling).

Hereinafter, one or more embodiments will be described with reference to accompanying drawings. Also, in the description of the present disclosure, certain detailed explanations of related functions or configurations are omitted when it is deemed that they may unnecessarily obscure the essence of the disclosure. All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies, and thus, the terms used herein have to be defined based on the meaning of the terms together with the description throughout the specification. Hereinafter, a BS may be a subject performing resource assignment of a terminal, and may be at least one of a gNode B, an eNode B, a Node B, a BS, a wireless access unit, a BS controller, and a node on a network. A terminal may include user equipment (UE), a mobile station (MS), a cellular phone, a smart phone, a computer, or a multimedia system capable of performing communication functions. In the present disclosure, a DL is a wireless transmission path of a signal transmitted from a BS to a terminal, and an UL is a wireless transmission path of a signal transmitted from a terminal to a BS. Also, one or more embodiments of the present disclosure will be described as an example of an LTE or LTE-A system, but the one or more embodiments may also be applied to other communication systems having a similar technical background or channel form. For example, 5G mobile communication technology (5G, new radio, NR) developed after LTE-A may be included. In addition, the one or more embodiments may be applied to other communication systems through some modifications within the scope of the present disclosure without departing from the scope of the present disclosure by the judgment of a person skilled in the art.

In an LTE system that is a representative example of the broadband wireless communication system, an orthogonal frequency division multiplexing (OFDM) scheme is used in a DL and a single carrier frequency division multiplexing (SC-FDMA) scheme is used in a UL. The UL refers to a wireless link through which a terminal, UE, or a MS transmits data or control signals to a BS or a gNode B, and the DL refers to a wireless link through which a BS transmits data or control signals to a terminal. In such a multiple access scheme, data or control information of each user is classified by generally assigning and operating the data or control information such that time-frequency resources for transmitting data or control information for each user do not overlap each other, (i.e., such that orthogonality is established).

An LTE system employs an HARQ scheme in which a physical layer retransmits data when a decoding failure occurs in initial transmission. In the HARQ scheme, when a receiver fails to accurately decode data, the receiver transmits information (negative acknowledgment (NACK)) indicating the decoding failure to the transmitter so that the transmitter may retransmit the corresponding data in the physical layer. The receiver combines the data retransmitted by the transmitter with the data whose previous decoding had failed so as to improve data reception performance. In addition, when the receiver accurately decodes the data, information (acknowledgment (ACK)) indicating successful decoding is transmitted to the transmitter so that the transmitter may transmit new data.

FIG. 1 is a diagram of a transmission structure of a time-frequency domain that is a DL wireless resource region of a LTE system or a similar system according an embodiment of the disclosure.

Referring to FIG. 1, a horizontal axis represents a time domain and a vertical axis represents a frequency domain in a wireless resource region. In the time domain, the minimum transmission unit is an OFDM symbol, and $N_{symb}$ OFDM symbols 102 are gathered to constitute one slot 106, and two slots are gathered to constitute one sub-frame 105. The length of the slot is 0.5 ms, and the length of the sub-frame is 0.1 ms. A radio frame 114 is a time domain interval composed of 10 sub-frames. The minimum transmission unit in the frequency domain is a subcarrier, and the transmission bandwidth of the whole system is composed of $N_{RB}^{DL}$ subcarriers 104 in total. However, such specific numerical values may vary according to a system. For example, in a 5G or NR system, a slot and a mini-slot (or non-slot) may support two types of slot structure. In a slot of 5G or NR system, Nsymb may be set to a value among 7 and 14, and in a mini-slot of 5G or NR system, Nsymb may be set to a value among 1 to 7.

In the time-frequency domain, a basic unit of a resource is a resource element (RE) 112, and may be indicated as an OFDM symbol index and a subcarrier index. A resource block (RB) 108 or a PRB is defined as $N_{symb}$ successive OFDM symbols 102 in the time domain and $N_{RB}$ successive subcarriers 110 in the frequency domain. Accordingly, one RB 108 is composed of $N_{symb} \times N_{RB}$ REs 112 in one slot.

In general, the frequency domain minimum assignment unit of data is RB, and in the LTE system, it is general that $N_{symb}$ is 7 and $N_{RB}$ is 2, and $N_{BW}$ and $N_{RB}$ are in proportion to the system transmission bandwidth. A data rate is increased in proportion to the number of RBs being scheduled.

In the LTE system, 6 transmission bandwidths may be defined and operated. In the case of a frequency division duplex (FDD) system that divides and operates a DL and an UL through a frequency, the transmission bandwidth of the DL and the transmission bandwidth of the UL may differ from each other. A channel bandwidth indicates a radio frequency (RF) bandwidth that corresponds to the system transmission bandwidth. Table 1 presents a corresponding relationship between the system transmission bandwidth defined in the LTE system and the channel bandwidth. For example, in the LTE system having the channel bandwidth of 10 MHz, the transmission bandwidth is composed of 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

DL control information may be transmitted within first N OFDM symbols in a sub-frame. N={1, 2, 3} in general. Accordingly, in accordance with the amount of control information to be transmitted in a current sub-frame, the value N may be varied for each sub-frame. The control information may include a control channel transmission interval indicator indicating how many OFDM symbols the control information is transmitted through, scheduling information on DL data or UL data, and a HARQ ACK/NACK signal.

In the LTE system, the scheduling information on the DL data or the UL data is transferred from a BS to a terminal through downlink control information (DCI). The DCI is defined in various formats, and may indicate, according to each format, whether the scheduling information is UL data scheduling information (UL grant) or DL data scheduling information (DL grant), whether the DCI is compact DCI having a small size of control information, whether spatial multiplexing using multiple antennas is applied, or whether the DCI is DCI for controlling power. For example, DCI format 1 that is the scheduling control information (DL grant) of the DL data may include at least the following control information:

Resource allocation type 0/1 flag: Indicates whether a resource allocation type is type 0 or type 1. The type 0 allocates resources in units of a resource block group (RBG) through applying of a bitmap type. In the LTE system, a basic unit of scheduling is RB that is expressed as a time and frequency domain resource, and the RBG is composed of a plurality of RBs to be considered as the basic unit of scheduling in the type 0. The type 1 allocates a specific RB in the RBG.

RB assignment: Indicates RB that is allocated for data transmission. An expressed resource is determined in accordance with a system bandwidth and a resource allocation method.

Modulation and coding scheme (MCS): indicates a modulation method used for data transmission and the size of a TB that is data to be transmitted.

HARQ process number: Indicates a process number of HARQ.

New data indicator: Indicates whether HARQ transmission is initial transmission or retransmission.

Redundancy version: Indicates a redundancy version of HARQ.

Transmit power control (TPC) command for physical uplink control channel (PUCCH): Indicates a transmission power control command for a PUCCH that is an UL control channel.

The DCI may be transmitted through a physical downlink control channel (PDCCH) (or control information, hereinafter, mixedly used) that is a DL physical control channel or an enhanced PDCCH (EPDCCH) (or enhanced control information, hereinafter, mixedly used) after passing through a channel coding and modulation process.

In general, the DCI is scrambled by a specific radio network temporary identifier (RNTI) or terminal identifier independently with respect to each terminal, is added with a cyclic redundancy check (CRC), is channel-coded, and then is configured as an independent PDCCH to be transmitted. In the time domain, the PDCCH is mapped and transmitted for the control channel transmission interval. A mapping location of the PDCCH in the frequency domain is determined by the identifier (ID) of each terminal, and the PDCCH may be transmitted through the transmission band of the whole system.

The DL data may be transmitted through a physical downlink shared channel (PDSCH) that is a physical channel for transmitting the DL data. The PDSCH may be transmitted after the control channel transmission interval, and scheduling information, such as a concrete mapping location or a modulation method in the frequency domain, may be included in the DCI to be transmitted through the PDCCH.

The BS notifies the terminal of a modulation method applied to the PDSCH to be transmitted and a transport block size (TBS) to be transmitted, by using an MCS among the control information constituting the DCI. The MCS may be composed of 5 bits, or may be composed of another number of bits. The TBS corresponds to the size before channel coding for error correction is applied to the TB to be transmitted by the BS.

The modulation method supported in the LTE system is quadrature phase shift keying (QPSK), 16 quadrature amplitude modulation (16QAM), or 64QAM, and respective modulation orders ($Q_m$) correspond to 2, 4, and 6. In the case of the QPSK modulation, 2 bits per symbol may be transmitted, in the case of the 16QAM modulation, 4 bits per symbol may be transmitted, and in the case of the 64QAM modulation, 6 bits per symbol may be transmitted. Also, a modulation method of 256QAM or more may be used according to system modification.

Figure 2:
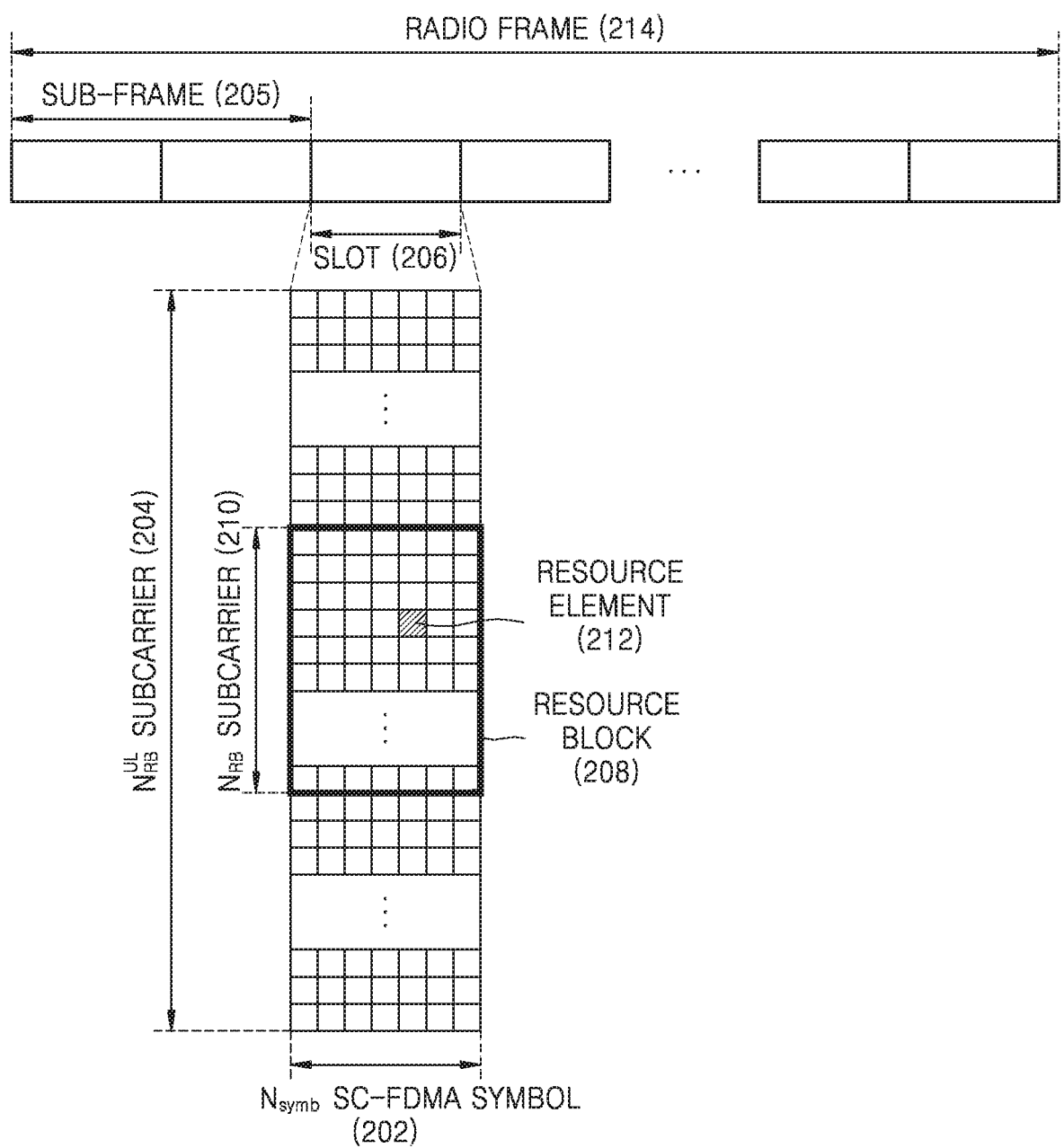
FIG. 2 is a diagram of a transmission structure of a time-frequency domain that is an uplink (UL) wireless resource region of a LTE system or a similar system according to an embodiment of the disclosure.

FIG. 2 is a diagram of a transmission structure of a time-frequency domain that is an UL wireless resource region of a LTE system or a similar system according to an embodiment of the disclosure.

Referring to FIG. 2, a horizontal axis represents a time domain and a vertical axis represents a frequency domain in a wireless resource region. In the time domain, the minimum transmission unit in a time domain is a SC-FDMA symbol 202, and $N_{symbUL}$ SC-FDMA symbols are gathered to constitute one slot 206. Two slots are gathered to constitute one sub-frame 205. The minimum transmission unit in the frequency domain is a subcarrier, and a transmission bandwidth of the whole system is composed of $N_{RB}^{UL}$ subcarriers 204 in total. $N_{RB}^{UL}$ may have a value in proportion to a system transmission bandwidth.

In the time-frequency domain, a basic unit of a resource is a RE 212, and may be defined as an SC-FDMA symbol index and a subcarrier index. A RB pair 208 is defined as $N_{symb}$ successive SC-FDMA symbols 202 in the time domain and $N_{RB}$ successive subcarriers 210 in the frequency domain. Accordingly, one RB is composed of $N_{symb} \times N_{RB}$ REs. In general, the minimum transmission unit of data or control information is an RB unit. A PUCCH may be mapped on the frequency domain corresponding to 1 RB, and transmitted for one sub-frame.

In the LTE system, the timing relationship between a PDSCH that is a physical channel for transmitting DL data or a PDCCH/EPDDCH including a semi-persistent scheduling (SPS) release and an UL physical channel (PUCCH or PUSCH) through which a corresponding HARQ ACK/NACK is transmitted may be defined. As an example, in the LTE system that operates as a FDD, the HARQ ACK/NACK corresponding to the PDSCH transmitted in the (n−4)-th sub-frame or the PDCCH/EPDCCH including the SPS release is transmitted by the PUCCH or PUSCH in the n-th subframe.

In the LTE system, a DL HARQ adapts an asynchronous HARQ method in which data re-transmission time is not fixed. When the HARQ NACK is fed back from the terminal with respect to the initially transmitted data transmitted by the BS, the BS freely determines the transmission time of re-transmitted data through the scheduling operation. The terminal buffers the data that is determined as an error as the result of decoding the received data for the HARQ operation, and then performs combining with the next re-transmitted data.

When PDSCH including DL data transmitted from the BS in a sub-frame n is received, the terminal transmits UL control information including HARQ ACK or NACK of the DL data to the BS through PUCCH or PUSCH in a sub-frame n+k. k may be differently defined in accordance with FDD or time division duplex (TDD) of the LTE system and a sub-frame configuration. As an example, in an FDD LTE system, k is fixed to 4. On the other hand, in a TDD LTE system, k may be changed in accordance with the sub-frame configuration and a sub-frame number. During data transmission through a plurality of carriers, the value of k may be differently applied in accordance with a TDD configuration of each carrier.

In the LTE system, in contrast to DL HARQ, UL HARQ adapts a synchronous HARQ method in which data transmission time is fixed. An UL/DL timing relationship among a physical uplink shared channel (PUSCH) that is a physical channel for transmitting the UL data, a PDCCH that is a preceding DL control channel, and a physical hybrid indicator channel (PHICH) that is a physical channel through which the DL HARQ ACK/NACK corresponding to the PUSCH is transmitted may be fixed by a following rule.

When the PDCCH including UL scheduling control information transmitted from the BS in the sub-frame n or the PHICH through which the DL HARQ ACK/NACK is transmitted is received, the terminal transmits the UL data corresponding to the control information through the PUSCH in the sub-frame n+k. k may be differently defined in accordance with the FDD or TDD of the LTE system and its configuration. As an example, in the FDD LTE system, k is fixed to 4. On the other hand, in the TDD LTE system, k may be changed in accordance with the sub-frame configuration and the sub-frame number. During data transmission through a plurality of carriers, the value of k may be differently applied in accordance with a TDD configuration of each carrier.

When the terminal receives the PHICH that carries the DL HARQ ACK/NACK from the BS in a sub-frame i, the PHICH corresponds to the PUSCH transmitted by the terminal in a sub-frame i−k. k is differently defined in accordance with the FDD or TDD of the LTE system and its configuration. As an example, in the FDD LTE system, k is fixed to 4. On the other hand, in the TDD LTE system, k may be changed in accordance with the sub-frame configuration and the sub-frame number. During data transmission through a plurality of carriers, the k value may be differently applied in accordance with the TDD configuration of each carrier.

TABLE 2

| Transmission Mode | DCI Format | Search Space | Transmission scheme of PDSCH corresponding to PDCCH |
|---|---|---|---|
| Mode 1 | DCI Format 1A | Common and terminal specific by C-RNTI | Single-antenna port, port 0 |
|  | DCI Format 1 | Terminal specific by C-RNTI | Single-antenna port, port 0 |
| Mode 2 | DCI Format 1A | Common and terminal specific by C-RNTI | Transmit diversity |
|  | DCI Format 1 | Terminal specific by C-RNTI | Transmit diversity |
| Mode 3 | DCI Format 1A | Common and terminal specific by C-RNTI | Transmit diversity |
|  | DCI Format 2A | Terminal specific by C-RNTI | Large delay CDD or transmit diversity |

TABLE 2-continued

| Transmission Mode | DCI Format | Search Space | Transmission scheme of PDSCH corresponding to PDCCH |
|---|---|---|---|
| Mode 4 | DCI Format 1A | Common and terminal specific by C-RNTI | Transmit diversity |
| | DCI Format 2 | Terminal specific by C-RNTI | Closed-loop spatial multiplexing or transmit diversity |
| Mode 5 | DCI Format 1A | Common and terminal specific by C-RNTI | Transmit diversity |
| | DCI Format 1D | Terminal specific by C-RNTI | Multi-user MIMO |
| Mode 6 | DCI Format 1A | Common and terminal specific by C-RNTI | Transmit diversity |
| | DCI Format 1B | Terminal specific by C-RNTI | Closed-loop spatial multiplexing using a single transmission layer |
| Mode 7 | DCI Format 1A | Common and terminal specific by C-RNTI | When the number of PBCH antenna ports is one, single-antenna port, port 0 is used, otherwise transmit diversity |
| | DCI Format 1 | Terminal specific by C-RNTI | Single-antenna port, port 5 |
| Mode 8 | DCI Format 1A | Common and terminal specific by C-RNTI | When the number of PBCH antenna ports is one, single-antenna port, port 0 is used, otherwise transmit diversity |
| | DCI Format 2B | Terminal specific by C-RNTI | Dual layer transmission, port 7 and 8 or single-antenna port, port 7 or 8 |

Table 2 shows supportable DCI formats according to each transmission mode in a condition set by C-RNTI in 3GPP TS 36.213. A terminal performs searching and decoding assuming that a DCI format exists in a control region interval according to a pre-set transmission mode. For example, when the terminal is instructed with Transmission Mode 5, the terminal searches a common search space and a terminal-specific search space for DCI format 1A, and searches only a terminal-specific search space for DCI format 2B.

A wireless communication system has been described above with reference to an LTE system, but an embodiment is not applied only to the LTE system, but may also be applied to various wireless communication systems, such as NR and 5G systems. When an embodiment is applied to another wireless communication system, the value of k may be changed even in a system using a modulation method corresponding to FDD.

Figure 3:
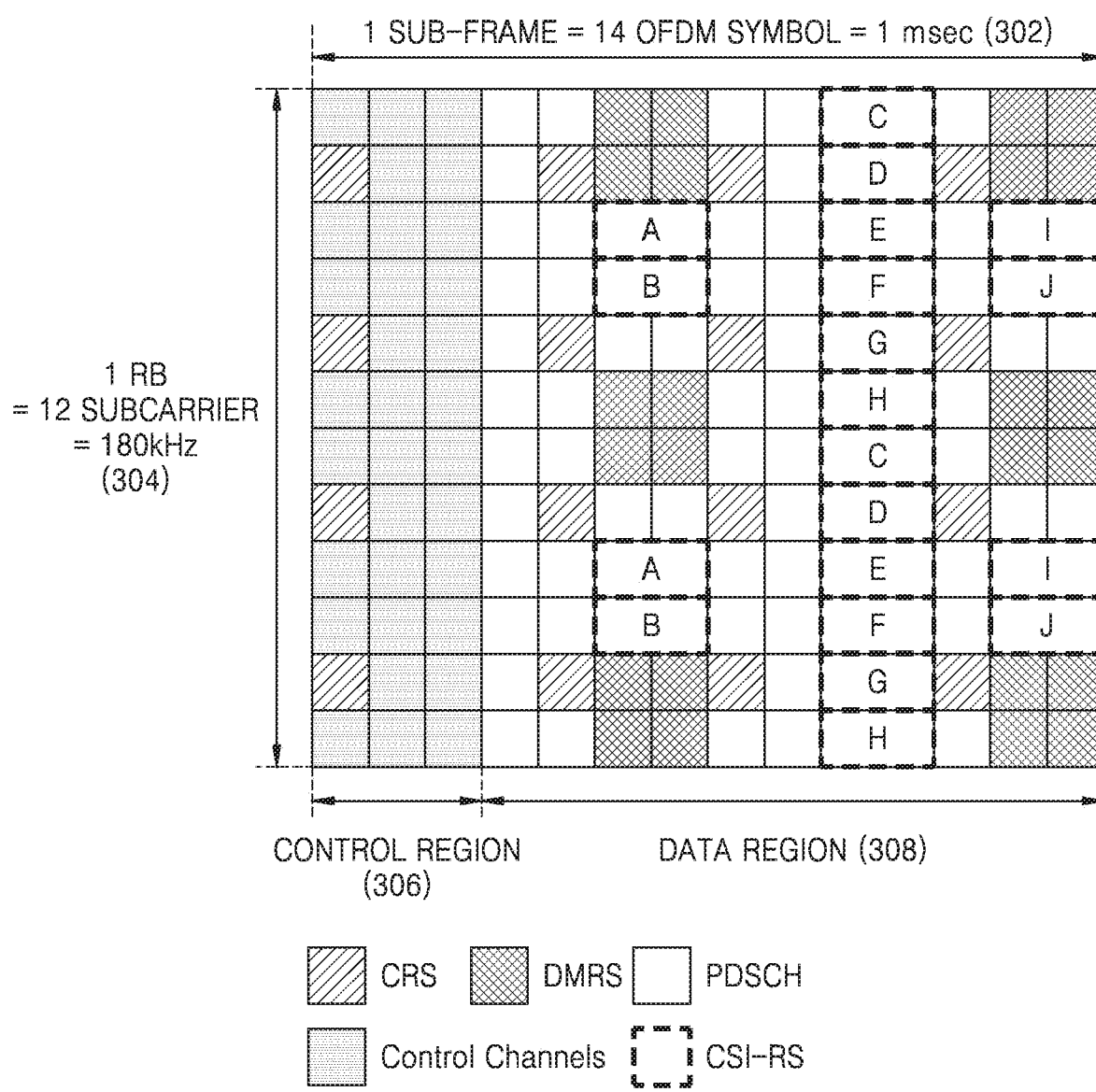
FIG. 3 is a diagram of a scheduled DL wireless resource region, according to an embodiment of the disclosure.

FIG. 3 is a diagram of a scheduled DL wireless resource region, according to an embodiment of the disclosure.

Referring to FIG. 3, a time axis of a wireless resource region indicates one sub-frame 302 including 14 OFDM symbols, and a frequency axis indicates one RB 304 including 12 sub-carriers. Accordingly, such a wireless resource region may have a total of 168 unique frequency and time locations. In LTE and LTE-A systems, each of the natural frequency and time locations is referred to as a RE.

Referring to FIG. 3, the following signals may be transmitted to the wireless resource region:

1) Cell specific reference signal (CRS): A RS periodically transmitted for all terminals in one cell, and commonly used by a plurality of terminals.

2) DMRS: A RS transmitted for a specific terminal, and transmitted only when data is transmitted to the specific terminal. DMRS may include total 8 DMRS ports. In LTE and LTE-A systems, a port 7 to a port 14 correspond to DMRS ports, and such ports maintain orthogonality by using code divisional multiplexing (CDM) or frequency divisional multiplexing (FDM) so as not to interfere with each other.

3) PDSCH: A DL data channel used by a BS to transmit traffic to a terminal, wherein the traffic is transmitted in a data region 308 of the wireless resource region by using an RE to which a RS is not transmitted.

4) Channel status information reference signal (CSI-RS): A RS transmitted for terminals included in one cell, and used to measure a channel state. A plurality of CSI-RS may be transmitted to one cell.

5) Other control channels (PHICH, PCFICH, and PDCCH): Control information necessary for a terminal to receive PDSCH is provided or ACK/NACK for operating HARQ with respect to UL data transmission is transmitted, wherein a control region 306 of the wireless resource region is used.

In an LTE-A system, muting may be set such that a CSI-RS transmitted by another BS is received by terminals of a cell without interference. Muting may be applied at a location where a CSI-RS may be transmitted, and a terminal may receive a traffic signal by skipping a corresponding wireless resource. In LTE-A, muting may be referred to as zero-power CSI-RS because, due to characteristics of muting, the muting is applied at a location of CSI-RS and power is not transmitted.

Referring to FIG. 3, CSI-RS may be transmitted by using some of locations indicated by A through J according to the number of antennas transmitting CSI-RS. Also, muting may be applied to some of the locations indicated by A through J. In particular, CSI-RS may be transmitted in 2, 4, or 8 REs according to the number of antenna ports. For example, when the number of antenna ports is 2, CSI-RS may be transmitted to half of a certain pattern shown in FIG. 3 and when the number of antenna ports is 4, CSI-RS may be transmitted to the entire certain pattern in FIG. 3. When the number of antenna ports is 8, CSI-RS may be transmitted by using two patterns.

In contrast, muting is always performed in one pattern unit. Muting may be applied to a plurality of patterns, but is unable to be applied to a part of one pattern when a location does not overlap with CSI-RS. Muting may be applied to a part of one pattern only when a location of CSI-RS and a location of muting overlap each other. For example, when CSI-RS with respect to two antenna ports is transmitted, CSI-RS may be transmitted as a signal of each antenna port from two REs connected to the time axis, wherein the signal of each antenna port is classified by an orthogonal code. Also, when CSI-RS with respect to four antenna ports is transmitted, a signal with respect to two antenna ports added in the same manner by further using two REs in addition to CSI-RS for two antenna ports may be transmitted. The same is applied to when CSI-RS with respect to 8 antenna ports is transmitted. In CSI-RS supporting 12 or 16 antenna ports, 3 of CSI-RS transmission locations with respect to existing 4 antenna ports may be combined or 2 of CSI-RS transmission locations with respect to 8 antenna ports may be combined.

Together with CSI-RS, CSI-interference measurement resource (CSI-IMR) may be assigned to a terminal (CSI-IM), and a resource of CSI-IM has the same resource structure and location as CSI-RS supporting 4 ports. The CSI-IMR is a resource for a terminal receiving data from at least one BS to accurately measure interference from an adjacent BS. For example, when an amount of interference when an adjacent BS transmits data and an amount of interference when the adjacent BS does not transmit data are measured, the BS may configure CSI-RS and two CSI-IMRs. One CSI-IMR enables an adjacent BS to always transmit a signal and the other CSI-IMR causes the adjacent BS to always not transmit a signal, thereby effectively measuring an amount of interference of the adjacent BS.

Figure 4:
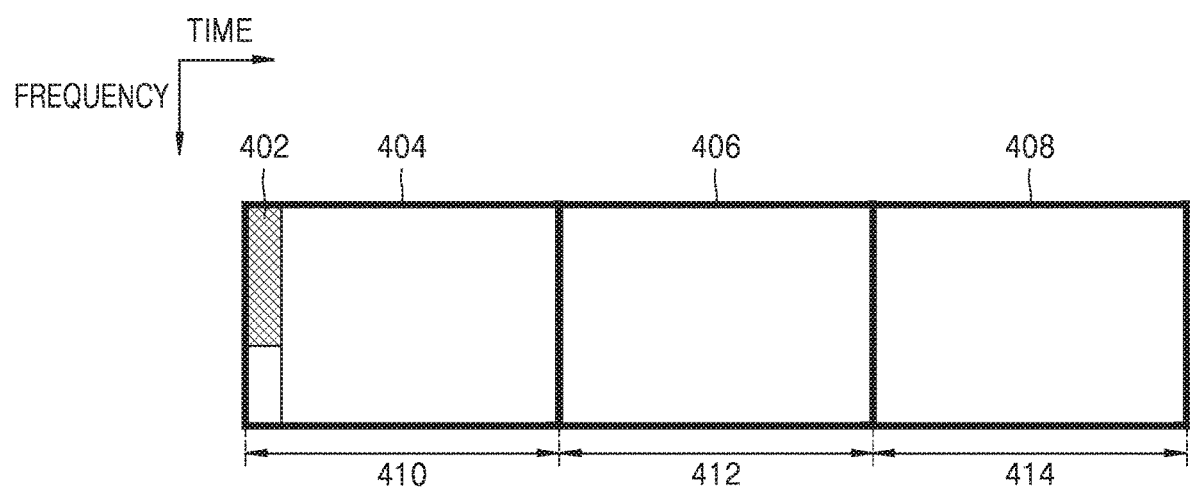
FIG. 4 is a diagram of a wireless resource region on which multiple transmission unit scheduling is performed, according to an embodiment of the disclosure.

FIG. 4 is a diagram of a wireless resource region on which multiple transmission unit scheduling is performed, according to an embodiment of the disclosure.

Referring to FIG. 4, the multiple transmission unit scheduling denotes performing scheduling on at least one transmission unit by using DL control information. The multiple transmission unit scheduling may include performing scheduling on at least one transmission unit by using DL control information included in one transmission unit. According to an embodiment, a transmission unit includes a transmission unit of a time domain, and more particularly, may include a slot, a sub-frame, a symbol, or a symbol group. In relation to FIGS. 4 and 5, a transmission unit is a slot.

However, this is only an example, and a transmission unit is not limited to a slot. In particular, a slot is a transmission unit that basically includes 14 OFDM symbols, but according to an embodiment, a slot may be a transmission unit including any number of OFDM symbols. For example, multiple transmission unit scheduling may be performed on a transmission unit including 2 or 3 OFDM symbols through DL control information.

Referring to FIG. 4, the multiple transmission unit scheduling may be multiple slot scheduling. The multiple slot scheduling may indicate that scheduling is performed on at least one slot, for example, slots 404 through 408, by using DL control information. In particular, scheduling may be performed on the slots 404 through 408 by using DL control information mapped to a resource region 402 assigned to a physical DL control channel included in the slot 404. Thus, the slots 404 through 408 may include the slot 404 including the resource region 402 assigned to the physical DL control channel. The resource region 402 assigned to the physical DL control channel may be located throughout a DL transmission bandwidth or at a part of the DL transmission bandwidth. In FIG. 4, the resource region 402 assigned to the physical DL control channel is located at the part of the DL transmission bandwidth, but alternatively, the resource region 402 assigned to the physical DL control channel may be located throughout the DL transmission bandwidth.

According to an embodiment, one or more slots on which multiple slot scheduling is performed may be consecutive or non-consecutive, or a combination of consecutive slots and non-consecutive slots. The one or more slots on which the multiple slot scheduling is performed may include a DL physical data channel, a physical UL data channel, or a combination thereof. In the slots on which the multiple slot scheduling is performed, the numbers of symbols to which UL data or DL data is transmitted may be the same or different, or the numbers of symbols to which UL data or DL data is transmitted may be the same in some slots while different in the remaining other slots. In addition, the slots on which the multiple slot scheduling is performed may all have the same frequency bands, partially have the same frequency bands, or all have different frequency bands.

In the present disclosure, the multiple slot scheduling may also be referred to as slot-aggregation scheduling, multi-slot scheduling, slot-bundling scheduling, repetition scheduling, or the like.

Multiple slot scheduling may be configured as UE common higher signaling or UE-specific higher signaling. According to such a setting, a terminal may search a pre-set DL control channel for a particular control information format or search certain RNTI for control information. A method of searching certain RNTI for control information may include attempting descrambling by using the certain RNTI when CRC combined with the control information is descrambled.

A method of setting multiple slot scheduling may include at least one of the following methods:

1) Instruction indicating the number of slots, and a starting symbol and a terminating symbol for each slot;

2) Instruction indicating the number of slots, and a slot common starting symbol and terminating symbol;

3) Instruction indicating a starting slot, a starting symbol of the starting slot, and a terminating symbol of a terminating slot;

4) Instruction indicating the number of slots, and a starting symbol and a symbol (group) unit transmission interval for each slot;

5) Instruction indicating the number of slots, a slot common starting symbol, and a symbol (group) unit transmission interval;

6) Instruction indicating a starting slot, and a starting symbol and a slot (group) unit transmission interval of the starting slot; or 7) Instruction indicating the number of slots (or a starting slot and a terminating slot)

During multiple slot scheduling, a BS may instruct a terminal about the number of slots used in the multiple slot scheduling, and a starting symbol and a terminating symbol for each slot. During the multiple slot scheduling, the BS may instruct the terminal about the number of slots used in the multiple slot scheduling, and a starting symbol and a terminating symbol commonly applied for each slot. Also, during the multiple slot scheduling, the BS may instruct the terminal about a starting slot used in the multiple slot scheduling and a starting symbol of the starting slot, and a terminating slot and a terminating symbol of the terminating slot. During the multiple slot scheduling, the BS may instruct the terminal about the number of slots, and a starting symbol and a symbol (group) unit transmission interval for each slot. During the multiple slot scheduling, the BS may instruct the terminal about the number of slots, a slot common starting symbol, and a symbol (group) unit transmission interval. During the multiple slot scheduling, the BS may instruct the terminal about a starting slot, a starting symbol of the starting slot, and a slot (group) unit transmission interval. During the multiple slot scheduling, the BS may instruct the terminal about the number of slots (or a combination of a starting slot and a terminating slot) used in the multiple slot scheduling. In this case, the BS may transmit information about the multiple slot scheduling to the terminal via higher signaling, L1 signaling, or a combination thereof.

According to an embodiment of the disclosure, a BS may support all of the above methods, or some of the above methods. When the BS supports all of the methods, the BS may instruct regarding one of the methods via terminal-specific higher signaling, terminal-common higher signaling, L1 signaling, or a combination thereof. The BS may separately instruct about only the number of slots in the methods via terminal-specific higher signaling, terminal-common higher signaling, L1 signaling, or a combination thereof. Also, the BS may instruct about the number of slots, a starting symbol, and a terminating symbol via terminal-specific higher signaling, terminal-common higher signaling, L1 signaling, or a combination thereof.

FIG. 4 illustrates a situation in which a BS performs multiple slot scheduling via a physical DL control channel and a physical data channel. First, the BS transmits the resource region 402 assigned to the physical DL control channel to a terminal by assigning DL control information including multiple slot scheduling information to the resource region 402. The DL control information may include the multiple slot scheduling information.

The BS may perform the multiple slot scheduling on the 3 consecutive slots 404 through 408. In this case, the numbers of symbols to which UL data or DL data mapped to the consecutively scheduled slots 404 through 408 is assigned may be the same or different. Accordingly, the lengths 410 through 414 of the slots 404 through 408 may be all the same, all different, or partially the same. Also, subsequent slots transmitted after the slots 404 through 408 of FIG. 4 may or may not include a pre-set control region. In other words, the BS may pre-determine whether to perform rate-matching on a physical DL control channel resource region (or a resource region set for another purpose) overlapping the multiple slot scheduling via higher signaling or L1 signal (or pre-setting via higher signaling or L1 signaling), or to map the corresponding resource region to a scheduled data region.

Data regions on which multiple slot scheduling is performed may include one TB for each slot, or all slots or at least one slot on which multiple slot scheduling is performed may include one TB. When all the slots or at least one slot on which multiple slot scheduling is performed include one TB, one slot may include some code blocks (or code block groups) included in the TB.

Terminal-specific higher signaling may include radio resource control (RRC) signaling, packet at a convergence protocol (PDCP) signaling, MAC control element (MAC CE), or the like, and terminal-common higher signaling may include a master information block (MIB) or a system information block (SIB). Also, terminal-specific L1 signaling may include terminal-specific control information and terminal-common L1 signaling may include terminal-common control information.

Figure 5:
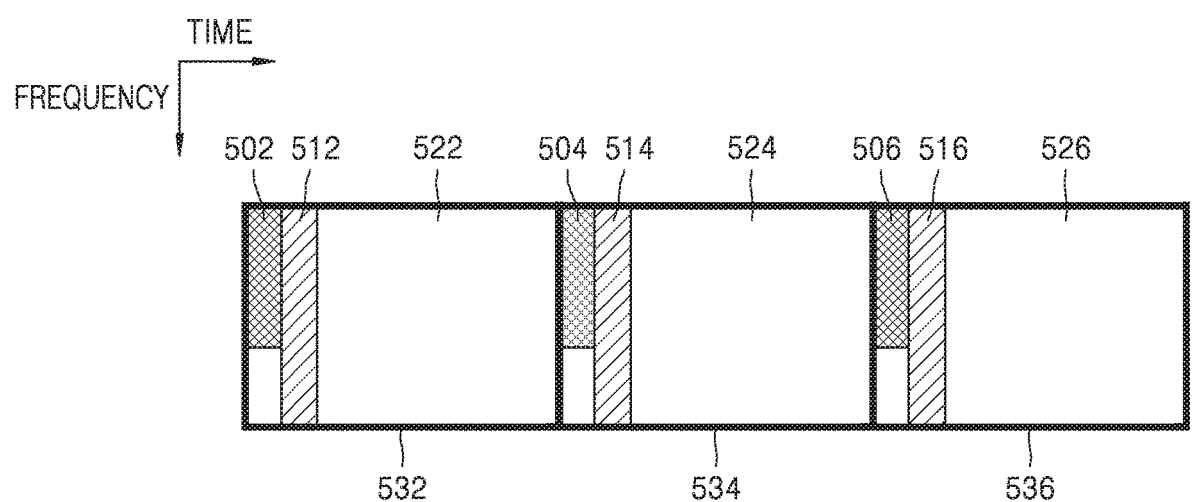
FIG. 5 is a diagram for describing demodulation reference signal (DMRS) bundling, according to an embodiment of the disclosure.

FIG. 5 is a diagram for describing DMRS bundling, according to an embodiment of the disclosure.

Referring to FIG. 5, a BS may transmit DL control information including multiple transmission unit scheduling information to a terminal through a terminal-common physical DL control channel or a terminal-specific physical DL control channel. The terminal detects, through blind decoding, the DL control information from the DL control channel pre-configured via higher signaling. The terminal receives the multiple transmission unit scheduling information included in the DL control information. The multiple transmission unit scheduling information includes scheduling information with respect to at least one transmission unit.

The terminal may receive scheduling with respect to consecutive slots 532 through 536. Resource regions 512 through 516 on which DMRS information may be mapped for demodulation and/or decoding of data transmitted through the slots 532 through 536 may be located respectively at front portions of the slots 532 through 536, but an embodiment is not limited thereto. Only the DMRS information may be mapped in the resource regions 512 through 516, or alternatively, DMRS information may be mapped on some of the resource regions 512 through 516 and another type of information, for example, data information, may be mapped on the remaining of the resource regions 512 through 516. In the resource regions 512 through 516 on which DMRS information may be mapped, a location of a symbol on which the DMRS information is mapped may be set via terminal-common (or terminal-specific) higher signaling (or L1 signaling) or may be indirectly set via another signaling. The location of the symbol on which the DMRS information is mapped may vary based on the total number of symbols occupied by resource regions 502 through 506 assigned to a physical DL control channel of the terminal set via terminal-common signaling or terminal-specific higher signaling, i.e., based on the sizes of the resource regions 502 through 506 assigned to the physical DL control channel. For example, when the number of symbols occupied by a resource region assigned to a physical DL control channel is n, a location of a symbol on which DMRS information is mapped may be set to n+k. k may be 1 or a natural value other than 1.

Referring to FIG. 5, according to an embodiment, the terminal may receive multiple slot scheduling with respect to the slots 532 through 536 by using the DL control information transmitted through the physical DL control channel. Here, the physical DL control channel of the slot 534 and the physical DL control channel of the slot 536 may each be pre-set to be used as the DL control channel, or may each be used as a data channel by a DL data channel or an UL data channel on which the multiple slot scheduling is performed. When the physical DL control channel is used as a data channel, all or some of physical resources for the DL control information may be used as physical resources for the DL data on which multiple slot scheduling is performed. When the physical DL control channel is not used as a data channel, the terminal may perform rate-matching only on a physical DL data region on which the multiple slot scheduling is performed, excluding a physical resource region for the DL control information.

The BS may notify the terminal of whether bundling (DMRS time bundling or DMRS time-axis bundling) of DMRS information contained in slots to which the multiple slot scheduling is performed is feasible in terms of time, for decoding of physical DL data resources on which the multiple slot scheduling is performed. The BS may instruct feasibility of bundling via terminal-specific higher signaling or terminal-common higher signaling, or via terminal-specific L1 signaling or terminal-common L1 signaling. Whether bundling of DMRS information included respectively in transmission units is feasible in terms of time may be instructed via higher signaling or L1 signaling.

When the BS notifies that DMRS time bundling is feasible, the terminal may perform channel estimation by using the DMRS information contained in the resource regions 512 through 516 on which the DMRS information existing in each slot may be mapped. For example, in order to demodulate and/or decode data information mapped on resource regions 522 through 526 assigned to the DL physical data channel, the channel estimation may be performed by using all or some of the DMRS information contained in the resource regions 512 through 516. Alternatively, the terminal may perform channel estimation by using the DMRS information contained in the resource regions 512 and 514 from the slots 532 and 534 or by using the DMRS information contained in the resource regions 512 through 516 form the slots 532 through 536. A channel estimation result obtained as such may be used to demodulate and/or decode the DL data.

FIG. 6 is a flowchart of a method, performed by a terminal, of transmitting and receiving data information, according to an embodiment of the disclosure.

Referring to FIG. 6, in operation 610, a terminal receives multiple transmission unit scheduling information. Hereinafter, for convenience of description, an example in which a transmission unit is a slot will be described. However, the transmission unit is not limited to a slot, and any other transmission unit may be used.

The terminal may receive DL data scheduling information by searching a DL control information region for DL control information, wherein the DL control information region is set via terminal-specific higher signaling or terminal-common higher signaling (or terminal-specific L1 signaling or terminal-common L1 signaling). The scheduling information may include at least one of single slot scheduling, multiple slot scheduling, and partial slot scheduling. In particular, all DL data may be subjected to signal slot scheduling or multiple slot scheduling, or some DL data may be subjected to single slot scheduling and the remaining DL data may be subjected to multiple slot scheduling. However, this is only an example and the DL data may be scheduled via any one of various methods.

In operation 620, the terminal receives information about whether DMRS time bundling is feasible with respect to DMRS information contained respectively in a plurality of transmission units that are scheduled according to the multiple transmission unit scheduling. The information about whether DMRS time bundling is feasible with respect to the DMRS information respectively contained in a plurality of slots on which multiple slot scheduling is performed may be transmitted together with scheduling DL control information. Alternatively, the BS may transmit the information about whether DMRS time bundling is feasible to the terminal via higher signaling, such as RRC or MAC CE. Alternatively, whether the DMRS time bundling is feasible may be pre-configured via higher signaling according to the number of slots on which multiple slot scheduling is performed. For example, the DMRS time bundling may be set to be feasible when the number of slots on which multiple slot scheduling is performed is lower than or equal to a threshold value, and the DMRS time bundling may be set to be unfeasible when the number of slots on which multiple slot scheduling is performed is equal to or higher than the threshold value. Alternatively, the DMRS time bundling may be set to be feasible when the number of slots on which multiple slot scheduling is performed is equal to or higher than the threshold value, and the DMRS time bundling may be set to be unfeasible when the number of slots on which multiple slot scheduling is performed is lower than or equal to the threshold value.

In addition, whether the DMRS time bundling is feasible may be pre-set via higher signaling, based on frequency hopping between the slots on which multiple slot scheduling is performed. For example, the DMRS time bundling may be set to be unfeasible when the frequency hopping is applied between the slots on which multiple slot scheduling is performed, and to be feasible when the frequency hopping is not applied between the slots.

In operation 630, when the DMRS time bundling is feasible, the terminal performs decoding on the data information based on at least one of a HARQ ACK or NACK transmission time, the size of a frequency resource of a DL physical data channel to which the data information scheduled according to the multiple transmission unit scheduling information is assigned, a timing advance value, and a time required for a valid data process. According to an embodiment, the terminal may perform DMRS time bundling on all or some DMRS information included in several slots, perform channel estimation, and then perform decoding on data information contained in multiple slot scheduling based on a channel estimation result. Alternatively, the terminal may perform channel estimation individually for DMRS information by using DMRS information respectively contained in slots, and then perform decoding on data information contained in a slot containing corresponding DMRS information based on each channel estimation result.

According to an embodiment, the terminal may perform channel estimation by using DMRS information existing in a transmission interval including the number of transmission units smaller than the number of slots, and perform decoding on data information existing in the transmission interval based on a channel estimation result.

When the DMRS time bundling is not feasible, the terminal may perform decoding on the data information based on the DMRS information respectively contained in the plurality of transmission units.

When the terminal receives single slot scheduling information in operation 610, the terminal may perform channel estimation individually for DMRS information by using the DMRS information contained respectively in slots, and then perform decoding on data information included in a slot in which corresponding DMRS information exists, based on each channel estimation result.

The various determination conditions described above may occur individually or in combination. In the present disclosure, a concept of multiple slot scheduling may be extended and applied as a concept of multiple transmission interval scheduling, in addition to at least one slot scheduling. Here, a transmission interval may be sufficiently replaced by a slot, a sub-frame, a symbol, or a symbol group.

FIG. 7 is a flowchart of a method, performed by a terminal, of processing data information, according to an embodiment of the disclosure.

Referring to FIG. 7, in operation 710, the terminal determines whether a condition is satisfied. According to an embodiment, the terminal may receive DL data scheduling information by searching a terminal-common control region or a terminal-specific control region for DL control information. DL data scheduling is multiple slot scheduling, and when DMRS time bundling is feasible with respect to DMRS information contained in each of a plurality of slots, the terminal may perform decoding based on certain conditions.

The certain conditions may include at least one of the following:

1) HARQ-ACK/NACK result report time;
2) Size of frequency resource of DL physical data channel to which data information is assigned;
3) Timing advance (TA) Value; or
4) Time required for valid data process The HARQ-ACK/NACK result report time denotes a time in which the terminal receives data via multiple slot scheduling and reports a result (i.e., HARQ-ACK/NACK) of performing demodulation and/or decoding is performed based on the received data. The terminal needs to perform the demodulation and/or decoding until the HARQ-ACK/NACK result report time, and thus a decoding method may vary based on whether the HARQ-ACK/NACK is able to be reported at the HARQ-ACK/NACK result report time. Alternatively, resources including a time and frequency for reporting the HARQ-ACK/NACK may be transmitted to the terminal together with control information instructing about the multiple slot scheduling. Alternatively, the resources including a time and frequency for reporting the HARQ-ACK/NACK may be transmitted to the terminal together with control information other than the control information instructing about the multiple slot scheduling. The resources including a time and frequency for reporting the HARQ-ACK/NACK may be at least one resource. For example, the resources composed of a time and frequency for reporting the HARQ-ACK/NACK with respect to a TB in each slot among slots on which multiple slot scheduling is performed may be the same, partially the same, or different from each other. In this case, the terminal may have different HARQ-ACK/NACK result report times according to TB on which multiple slot scheduling is performed, and thus a decoding method may vary according to the TBs.

According to an embodiment, the terminal may perform decoding based on a difference between a reception starting time of data on which multiple slot scheduling is performed and the HARQ-ACK/NACK result report time. Alternatively, the terminal may perform decoding based on a difference between a reception ending time of the data on which multiple slot scheduling is performed and the HARQ-ACK/NACK result report time. Alternatively, the terminal may perform decoding based on a difference between a certain time (a starting time or ending time of an individual code block (group) or individual TB) while receiving the data on which multiple slot scheduling is performed and the HARQ-ACK/NACK result report time.

Alternatively, the terminal may perform decoding on a TB based on a difference between a certain time (a starting time or ending time of the individual TB) while receiving the data on which multiple slot scheduling is performed and a HARQ-ACK/NACK result report time with respect the TB. Alternatively, the terminal may perform decoding based on a difference between a certain time at which DMRS information for data reception is included and the HARQ-ACK/NACK result report time. Alternatively, the terminal may perform decoding based on a difference between a time when control information for scheduling data is received and the HARQ-ACK/NACK result report time.

According to an embodiment, a time may include a time when receiving or transmitting of a symbol or slot constituting a resource region to which information is mapped is started and/or a time when the receiving or transmitting of the symbol or slot is ended. For example, the HARQ-ACK/NACK result report time may include a time when transmitting of a resource to which HARQ-ACK/NACK is assigned is started and/or a time when the transmitting of the resource is ended. A difference between a certain time and another time may be represented by a time interval, and such a time interval may be indicated by a certain value. The certain value may have a positive value or a negative value, or may be equal 0, based on a reference time. When the certain value has a negative value, an order of resource regions assigned for specific physical control or data channels is switched.

According to an embodiment, information related to the HARQ-ACK/NACK result report time (for example, HARQ-ACK/NACK transmission time, a time interval value, etc) may be obtained when the terminal succeeds in searching and detecting DL control information scrambled by certain RNTI. Alternatively, information related to the HARQ-ACK/NACK result report time, which is pre-set via higher signaling may be used. Alternatively, a group of information related to the HARQ-ACK/NACK result report time, which is settable via higher signaling may be received, and a certain value may be instructed among the group via L1 signaling.

According to an embodiment, a size of a frequency resource of a DL physical data channel to which data information is assigned denotes a size of a frequency resource of a physical data channel to which data on which multiple slot scheduling is performed is assigned. Information about a size of a frequency resource may be obtained when the terminal succeeds in searching and detecting DL control information scrambled by certain RNTI. Alternatively, when certain bandwidth part (BWP) interval (the frequency band interval) is set among frequency bands of the entire system, a size of a frequency resource of a DL physical data channel to which data information is assigned may be derived by using a size of a frequency band interval or comparing the BWP interval with the frequency band interval.

A timing advance (TA) value is a value set for the terminal and the BS to perform UL synchronization, and is applicable when the terminal is aware of an accumulated TA value obtained by accumulating TA values. The TA value may be an absolute TA value in which TA values received by the terminal from the BS are accumulated. Alternatively, the terminal may receive a certain TA value from the BS, and use the certain TA value to determine a certain condition. Such TA values may be transmitted to the terminal via RRC or MAC CE.

A time required for a valid data process denotes a total time required for a data process operation. The time required for a valid data process includes a time required for data reception, a time required for channel estimation, a time required for data demodulation and/or decoding, and a time required for reporting HARQ-ACK/NACK. The time required for a valid data process may be determined by using a value self-calculated by the terminal or by considering information received from the BS overall. For example, the terminal may calculate the time required for a valid data process considering at least one of the size of a data total transmission interval, DMRS location information, the size of a frequency band, a size of an individual data transmission interval, a location of HARQ-ACK/NACK time resource, and interruption or preemption generation (or resource location).

In operation 710, the terminal may determine at least one condition among a HARQ-ACK/NACK transmission time, the size of frequency resources of a DL physical data channel to which data information scheduled by multiple transmission unit scheduling information is assigned, a TA value, and a time required for a valid data process, and perform decoding differently based on whether the condition is satisfied.

The terminal may perform time bundling with respect to at least two elements of DMRS information among DMRS information contained respectively in a plurality of transmission units based on whether the condition is satisfied, and perform decoding on data information based on the DMRS information on which the time bundling is performed. The terminal may perform time bundling with respect to the DMRS information contained respectively in the plurality of transmission units. The terminal may perform time bundling with respect to DMRS information contained in a first transmission unit containing first data information and DMRS information contained in a second transmission unit received immediately after the first transmission unit. The terminal may perform time bundling with respect to the DMRS information contained in the first transmission unit containing the first data information and DMRS information contained in at least one transmission unit received before the first transmission unit. The terminal may perform time bundling with respect to the DMRS information contained in the first transmission unit containing the first data information and DMRS information contained in at least one transmission unit received after the first transmission unit.

According to an embodiment, the terminal may perform decoding on data information based on DMRS information respectively contained in a plurality of transmission units, based on whether a condition is satisfied.

Referring to FIG. 7, the terminal determines whether a condition is satisfied in operation 710. According to an embodiment, Condition 1 includes the following conditions:

1) When a HARQ-ACK/NACK transmission time is equal to or higher than a threshold value;

2) When the size of a frequency resource of a DL physical data channel to which data information scheduled according to multiple transmission unit scheduling information is assigned is lower than or equal to a threshold value;

3) When a TA value is lower than or equal to a threshold value; or

4) When a time required for a valid data process is lower than or equal to a threshold value When at least one of the conditions in Condition 1 is satisfied, the terminal may perform decoding according to operation 1 in operation 720. Operation 1 may be a combination of at least two of the following. Hereinafter, a case in which a transmission unit is a slot is described.

1) perform decoding on data after performing DMRS time bundling with respect to all DMRS information contained respectively in slots on which multiple slot scheduling is performed (e.g., demodulate and/or decode data contained in the resource regions 522 through 526 assigned to a DL physical data channel by performing channel estimation after performing time bundling on DMRS information contained in the resource regions 512 through 516 on which DMRS information may be mapped in FIG. 5);

2) perform decoding on data after performing time bundling with respect to DMRS information pre-received before certain data is received (e.g., demodulate and/or decode data contained in the resource region 522 assigned to a DL physical data channel by performing channel estimation through DMRS information contained in the resource region 512 on which DMRS information may be mapped in FIG. 5. Alternatively, demodulate and/or decode data contained in the resource region 524 assigned to a DL physical data channel by performing channel estimation after performing time bundling on DMRS information contained in the resource regions 512 and 514 on which DMRS information may be mapped. Alternatively, demodulate and/or decode data contained in the resource region 526 assigned to a DL physical data channel by performing channel estimation after performing time bundling on DMRS information contained in the resource regions 512 through 516 on which DMRS information may be mapped);

3) perform decoding on data after performing time bundling with respect to DMRS information pre-received before certain data is received and DMRS information received immediately after the certain data is received (e.g., demodulate and/or decode data contained in the resource region 522 assigned to a DL physical data channel by performing channel estimation after performing time bundling on DMRS information contained in the resource regions 512 and 514 on which DMRS information may be mapped in FIG. 5. Alternatively, demodulate and/or decode data contained in the resource region 524 assigned to a DL physical data channel by performing channel estimation after performing time bundling on DMRS information contained in the resource regions 512 through 516 on which DMRS information may be mapped. Alternatively, demodulate and/or decode data contained in the resource region 526 assigned to a DL physical data channel by performing channel estimation after performing time bundling on DMRS information contained in the resource regions 512 through 516 on which DMRS information may be mapped);

4) perform decoding on data after performing time-axis bundling only on DMRS information contained in a slot containing certain data and a slot immediately thereafter (e.g., demodulate and/or decode data contained in the resource region 522 assigned to a DL physical data channel by performing channel estimation after performing time bundling on DMRS information contained in the resource regions 512 and 514 on which DMRS information may be mapped in FIG. 5. Alternatively, demodulate and/or decode data contained in the resource region 524 assigned to a DL physical data channel by performing channel estimation after performing time bundling on DMRS information contained in the resource regions 514 and 516 on which DMRS information may be mapped. Alternatively, demodulate and/or decode data contained in the resource region 526 assigned to a DL physical data channel by performing channel estimation after performing time-axis bundling on DMRS information contained in the resource region 516 on which DMRS information may be mapped); and 5) perform decoding on data in the same slot as DMRS information after performing channel estimation on the DMRS information contained in each slot on which multiple slot scheduling is performed (e.g., demodulate and/or decode data contained in the resource region 522 assigned to a DL physical data channel after performing channel estimation by using DMRS information contained in the resource region 512 on which DMRS information may be mapped in FIG. 5. Alternatively, demodulate and/or decode data contained in the resource region 524 assigned to a DL physical data channel by performing channel estimation after performing time bundling on DMRS information contained in the resource region 514 on which DMRS information may be mapped. Alternatively, demodulate and/or decode data contained in the resource region 526 assigned to a DL physical data channel by performing channel estimation after performing time bundling on DMRS information contained in the resource region 516 on which DMRS information may be mapped).

According to an embodiment, in operation 1, when the terminal fails to demodulate and/or decode data by performing channel estimation without performing DMRS time bundling first, the terminal may additionally demodulate and/or decode data by performing channel estimation after performing DMRS time bundling. For example, referring to FIG. 5, first, the terminal may perform channel estimation by using DMRS information contained in the resource region 512 on which DMRS information may be mapped and use the DMRS information to demodulate and/or decode data contained in the resource region 522 assigned to a DL physical data channel. When demodulating and/or decoding succeeds, DMRS time bundling is not required to be performed additionally to demodulate and/or decode the data contained in the resource region 522 assigned to a DL physical data channel. However, when demodulating and/or decoding fails, the terminal may perform time bundling on DMRS information contained in the resource regions 512 through 516 on which DMRS information may be mapped, and then use the DMRS information to demodulate and/or decode the data contained in the resource region 522 assigned to a DL physical data channel by performing channel estimation. In other words, at least two types of DMRS channel estimation results may be used to demodulate and/or decode data contained in the resource region 522 assigned to a DL physical data channel.

In operation 710, the terminal determines whether a condition is satisfied. Condition 2 includes the following conditions:

1) When a HARQ-ACK/NACK transmission time is lower than or equal to a threshold value;

2) When the size of a frequency resource of a DL physical data channel to which data information scheduled according to multiple transmission unit scheduling information is assigned is equal to or higher than a threshold value;

3) When a TA value is equal to or higher than a threshold value; or

4) When a time required for a valid data process is equal to or higher than a threshold value When at least one of the conditions in Condition 2 is satisfied, the terminal may perform decoding according to operation 2 in operation 730. Operation 1 may be a combination of at least one of the following. Hereinafter, a case in which a transmission unit is a slot is described.

1) perform decoding on data contained in the same slot as DMRS information after performing channel estimation on the DMRS information contained in each slot on which multiple slot scheduling is performed (e.g., demodulate and/or decode data contained in the resource region 522 assigned to a DL physical data channel after performing channel estimation by using DMRS information contained in the resource region 512 on which DMRS information may be mapped in FIG. 5. Alternatively, demodulate and/or decode data contained in the resource region 524 assigned to the DL physical data channel after performing channel estimation by using DMRS information contained in the resource region 514 on which DMRS information may be mapped. Alternatively, demodulate and/or decode data contained in the resource region 526 assigned to a DL physical data channel after performing channel estimation by using DMRS information contained in the resource region 516 on which DMRS information may be mapped)

2) perform decoding on data after performing time bundling on DMRS information pre-received before certain data is received (for example, demodulate and/or decode data contained in the resource region 522 assigned to a DL physical data channel after performing channel estimation by using DMRS information contained in the resource region 512 on which DMRS information may be mapped in FIG. 5. Alternatively, demodulate and/or decode data contained in the resource region 524 assigned to the DL physical data channel by performing channel estimation after performing time bundling on DMRS information contained in the resource regions 512 and 514 on which DMRS information may be mapped. Alternatively, demodulate and/or decode data contained in the resource region 526 assigned to a DL physical data channel by performing channel estimation after performing time bundling on DMRS information contained in the resource regions 512 through 516 on which DMRS information may be mapped)

3) perform decoding on data after performing time bundling on DMRS information pre-received before certain data is received and DMRS information received immediately after the certain data is received (for example, demodulate and/or decode data contained in the resource region 522 assigned to a DL physical data channel by performing channel estimation after performing time bundling on DMRS information contained in the resource regions 512 and 514 on which DMRS information may be mapped in FIG. 5. Alternatively, demodulate and/or decode data contained in the resource region 524 assigned to the DL physical data channel by performing channel estimation after performing time bundling on DMRS information contained in the resource regions 512 through 516 on which DMRS information may be mapped. Alternatively, demodulate and/or decode data contained in the resource region 526 assigned to a DL physical data channel by performing channel estimation after performing time bundling on DMRS information contained in the resource regions 512 through 516 on which DMRS information may be mapped)

As described above, operation 1 and operation 2 are not conflicting operations. According to an embodiment, operation 1 and operation 2 may be set as one pair. For example, the performing of decoding on data after performing DMRS time bundling on all DMRS information contained in slots on which multiple slot scheduling is performed in operation 1 and the performing of decoding on data after performing time bundling on DMRS information pre-received before certain data is received and DMRS information received immediately after the certain data is received in operation 2 may be set as one pair. In this case, when Condition 1 is satisfied, the terminal may perform decoding on data after performing DMRS time bundling on all DMRS information contained in slots on which multiple slot scheduling is performed, and when Condition 2 is satisfied, the terminal may perform decoding on data after performing time bundling on DMRS information pre-received before certain data is received and DMRS information received immediately after the certain data is received. However, this is only an example, and alternatively, operation 1 and operation 2 may be variously set as one pair. Also, operation 1 and operation 2 may not be matched with the same number of operations. For example, two operations in operation 1 and one operation in operation 2 may be set as one pair.

Figure 8:
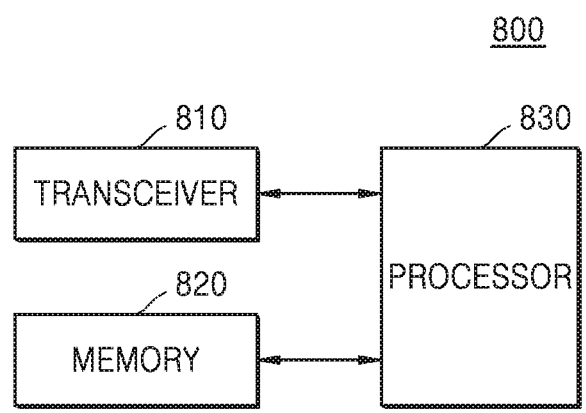
FIG. 8 is a block diagram of a structure of a terminal, according to an embodiment of the disclosure.

FIG. 8 is a block diagram of a structure of a terminal 800, according to an embodiment of the disclosure.

Referring to the FIG. 8, the terminal 800 may include a transceiver 810, a memory 820, and a processor 830. The transceiver 810, the memory 820, and the processor 830 of the terminal 800 may operate according to a communication method of the terminal 800. However, not all of the illustrated components are essential. The terminal 800 may be implemented by more or less components than those illustrated in FIG. 8. In addition, the transceiver 810, the memory 820, and the processor 830 may be implemented as a single chip.

The transceiver 810 may transmit or receive a signal to or from a BS. Here, the signal may include control information and data. In this regard, the transceiver 810 may include a RF transmitter for up-converting and amplifying a frequency of a transmitted signal, and a RF receiver for amplifying low-noise and down-converting a frequency of a received signal. However, components of the transceiver 810 are not limited to the RF transmitter and the RF receiver.

The transceiver 810 may receive and output, to the processor 830, a signal through a wireless channel, and transmit a signal output from the processor 830 through the wireless channel.

The memory 820 may store a program and data required for operations of the terminal 800. The memory 820 may store control information or data included in a signal obtained by the terminal 800. The memory 820 may be a storage medium, such as read-only memory (ROM), random access memory (RAM), a hard disk, a CD-ROM, and a digital versatile disc (DVD), or a combination of storage media.

The processor 830 may control a series of processes such that the terminal 800 operates as described above. According to an embodiment, the processor 830 may receive multiple transmission unit scheduling information, receive information about whether DMRS time bundling is feasible with respect to DMRS information contained in a plurality of transmission units that are scheduled by the multiple transmission unit scheduling information, and when the DMRS time bundling is feasible, perform decoding on data information based on at least one of an HARQ ACK/NACK transmission time, the size of frequency resources of a DL physical data channel to which the data information scheduled according to the multiple transmission unit scheduling information is assigned, a timing advance value, and a time required for a valid data process.

Figure 9:
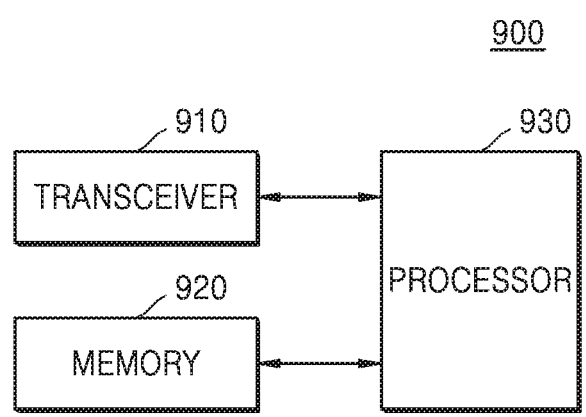
FIG. 9 is a block diagram of a structure of a base station (BS), according to an embodiment of the disclosure.

FIG. 9 is a block diagram of a structure of a BS 900, according to an embodiment of the disclosure.

Referring to the FIG. 9, the BS 900 may include a transceiver 910, a memory 920, and a processor 930. The transceiver 910, the memory 920, and the processor 930 of the BS 900 may operate according to a communication method of the BS 900. However, not all of the illustrated components are essential. The BS 900 may be implemented by more or less components than those illustrated in FIG. 9. In addition, the transceiver 910, the memory 920, and the processor 930 may be implemented as a single chip.

The transceiver 910 may transmit or receive a signal to or from a terminal. Here, the signal may include control information and data. In this regard, the transceiver 910 may include a RF transmitter for up-converting and amplifying a frequency of a transmitted signal, and a RF receiver for amplifying low-noise and down-converting a frequency of a received signal. However, components of the transceiver 910 are not limited to the RF transmitter and the RF receiver.

The transceiver 910 may receive and output, to the processor 930, a signal through a wireless channel, and transmit a signal output from the processor 930 through the wireless channel.

The memory 920 may store a program and data required for operations of the BS 900. The memory 920 may store control information or data included in a signal obtained by the BS 900. The memory 920 may be a storage medium, such as ROM, RAM, a hard disk, a CD-ROM, and a DVD, or a combination of storage media.

The processor 930 may control a series of processes such that the BS 900 may operate according to an embodiment described above. According to an embodiment, the processor 930 may control processes of setting multiple slot scheduling or instructing a terminal about the feasibility of bundling through higher signaling.

According to one or more embodiments, a service may be effectively provided in a wireless communication system.

It should be understood that embodiments described herein should be considered in a descriptive sense only and not for purposes of limitation. Descriptions of features or aspects within each embodiment should typically be considered as available for other similar features or aspects in other embodiments. Also, the embodiments described above may operate in combination with each other as occasion demands. For example, a BS and a terminal may operate with some of the embodiments combined together. Also, the above embodiments are suggested based on an NR system, but other modifications based on the technical aspects of the embodiments may be possible for other systems, such as FDD or TDD LTE systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a terminal in a wireless communication system, of transmitting and receiving data information, the method comprising:
   receiving scheduling information for scheduling a plurality of transmission units;
   receiving information for indicating whether bundling of demodulation reference signal (DMRS) information respectively contained in the plurality of transmission units scheduled according to the scheduling information is feasible with respect to time;
   when the information indicates that time bundling of the DMRS information is feasible, performing the time bundling on at least two of the DMRS information from among the DMRS information respectively contained in the plurality of transmission units based on at least one of a hybrid automatic request (HARQ) acknowledge (ACK)/negative acknowledge (NACK) transmission time, a size of a frequency resource of a downlink (DL) physical data channel to which the data information scheduled according to the scheduling information is assigned, a timing advance value, or a time required for a valid data process;
   performing a first channel estimation based on the time bundled DMRS information; and
   decoding data contained in the plurality of transmission units based on a first channel estimation result.

2. The method of claim 1,
   wherein the performing of the time bundling comprises performing time bundling on DMRS information contained in a first transmission unit containing first data and DMRS information contained in a second transmission unit received immediately after the first transmission unit, and
   wherein the decoding of the data comprises decoding the first data contained in the first transmission unit.

3. The method of claim 1,
wherein the performing of the time bundling comprises performing time bundling on DMRS information contained in a first transmission unit containing first data and DMRS information respectively contained in at least one transmission unit received before the first transmission unit, and
wherein the decoding of the data comprises decoding the first data contained in the first transmission unit.

4. The method of claim 1,
wherein the performing of the time bundling comprises performing time bundling on DMRS information contained in a first transmission unit containing first data information, DMRS information respectively contained in at least one transmission unit received before the first transmission unit and DMRS information respectively contained in a second transmission unit received immediately after the first transmission unit, and
wherein the decoding of the data comprises decoding the first data contained in the first transmission unit.

5. The method of claim 1,
wherein the performing of the time bundling comprises performing time bundling on DMRS information contained in a first transmission unit containing first data information; and
wherein the decoding of the data comprises decoding the first data contained in a first transmission unit.

6. The method of claim 1, further comprising:
when the information indicates that the time bundling of the DMRS information is not feasible, performing a second channel estimation based on the DMRS information respectively contained in the plurality of transmission units; and
decoding the data based on a second channel estimation result.

7. The method of claim 1, further comprising:
performing a third channel estimation based on the DMRS information respectively contained in the plurality of transmission units; and
decoding the data based on a third channel estimation result.

8. The method of claim 1, wherein each of the plurality of transmission units comprises at least one of a slot, a subframe, a symbol or a symbol group.

9. The method of claim 7, further comprising
performing, when the decoding based on the third channel estimation result fails, DMRS time bundling on at least two of DMRS information from among the DMRS information respectively contained in the plurality of transmission units;
performing a fourth channel estimation based on the time bundled DMRS information; and
decoding the data based on a fourth channel estimation result.

10. A terminal for transmitting and receiving data information in a wireless communication system, the terminal comprising:
a communicator configured to communicate with a base station (BS); and
at least one processor configured to:
receive scheduling information for scheduling a plurality of transmission units,
receive information for indicating whether bundling of demodulation reference signal (DMRS) information respectively contained in the plurality of transmission units scheduled according to the scheduling information is feasible with respect to time,
when the information indicates that the time bundling of the DMRS information is feasible, perform the time bundling on at least two of the DMRS information from among the DMRS information respectively contained in the plurality of transmission units based on at least one of a hybrid automatic request (HARD) acknowledge (ACK)) transmission time/negative acknowledge (NACK) transmission time, a size of a frequency resource of a downlink (DL) physical data channel to which the data information scheduled according to the scheduling information is assigned, a timing advance value, or a time required for a valid data process,
perform a first channel estimation based on the time bundled DMRS information, and
decode data contained in the plurality of transmission units based on a first channel estimation result.

11. The terminal of claim 10, wherein the at least one processor is further configured to perform the time bundling on DMRS information contained in a first transmission unit containing first data and DMRS information contained in a second transmission unit received immediately after the first transmission unit, and decode the first data contained in the first transmission unit.

12. The terminal of claim 10, wherein the at least one processor is further configured to perform the time bundling on DMRS information contained in a first transmission unit containing first data and DMRS information respectively contained in at least one transmission unit received before the first transmission unit and decode the first data contained in the first transmission unit.

13. The terminal of claim 10, wherein the at least one processor is further configured to perform the time bundling on DMRS information contained in a first transmission unit containing first data information, DMRS information respectively contained in at least one transmission unit received before the first transmission unit and DMRS information respectively contained in a second transmission unit received immediately after the first transmission unit and decode the first data contained in the first transmission unit.

14. The terminal of claim 10, wherein the at least one processor is further configured to perform time bundling on DMRS information contained in a first transmission unit containing first data information, and decode the first data contained in the first transmission units.

15. The terminal of claim 10, wherein, when the information indicates that the time bundling of the DMRS information is not feasible, the at least one processor is further configured to perform a second channel estimation based on the DMRS information respectively contained in the plurality of transmission unit, and decode the data based on a second channel estimation result.

16. The terminal of claim 10, wherein the at least one processor is further configured to:
perform a third channel estimation based on the DMRS information respectively contained in the plurality of transmission units, and decode the data based on a third channel estimation result.

17. The terminal of claim 10, wherein each of the plurality of transmission units comprises a slot.

18. The terminal of claim 16, wherein the at least one processor is further configured to:
perform, when the decoding based on the third channel estimation result fails, DMRS time bundling on at least two of DMRS information from among the DMRS information respectively contained in the plurality of transmission units, perform a fourth channel estimation based on the time bundled DMRS information and decode the data based on a fourth channel estimation result.

* * * * *